2,558,241

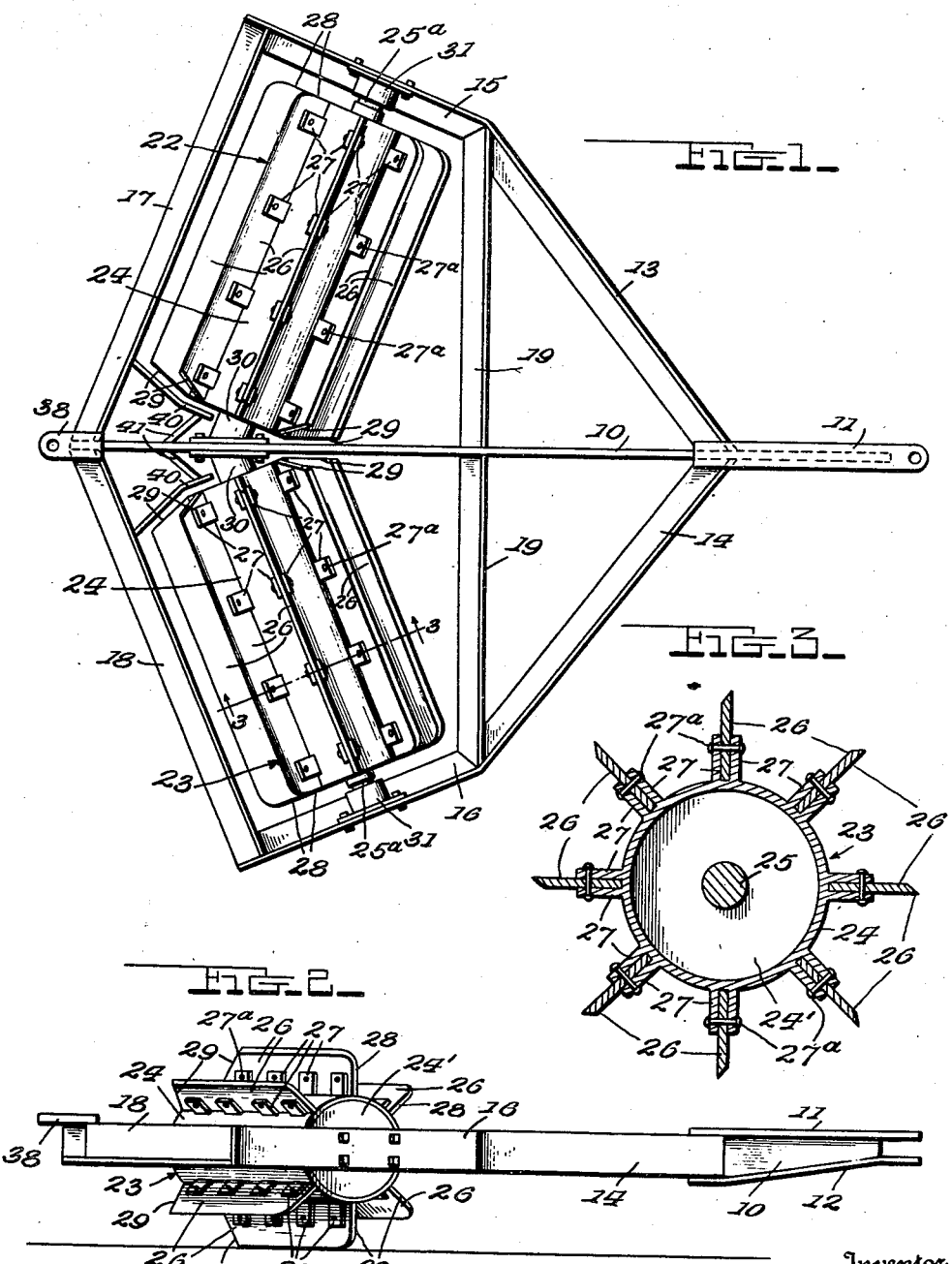
June 26, 1951     M. ELLER     2,558,241
WEED CHOPPER
Filed Jan. 26, 1950
Inventor
Martin Eller Patented June 26, 1951

UNITED STATES PATENT OFFICE 2,558,241

WEED CHOPPER

Marlin Eller, Deerfield Beach, Fla.

Application January 26, 1950, Serial No. 140,671

10 Claims. (Cl. 55—61)

This invention relates to a weed chopper having a hacking and slicing action.

In the past, it has been a custom to drag a disk harrow over a field having tall and tough weeds: the harrow disks tend to gather the weeds and direct them so that they lie in the directions of the blades, and hence the cutting action fails. When choppers resembling rollers, with projecting blades, are drawn over a field in the usual fashion of a roller, that is, at right angles to the roller shaft, each blade can beat down the weeds flat upon the ground; but the blade then rests on the weeds as the roller turns, and while scoring occurs, the weeds are not surely severed into the desired short lengths.

A feature of the present invention is a weed chopper which has a combined hacking and slicing action as it fells and passes over weeds.

Another feature is the provision of a weed chopper having balanced parts to compensate tendency of individual parts toward sidewise motion as the device passes over the weeds.

A further feature is the provision of a weed chopper, in which a strong braced frame is provided to support a pair of weed chopping devices and transfer side-wise stresses therebetween.

Another feature is a cheap and simple assembly of few parts and easy construction, capable of producing combined hacking and slicing actions upon weeds.

With these and other features as objects in view, as will appear in the course of the following description and claims, illustrative embodiments of the invention are shown on the accompanying drawing, in which:

Fig. 1 is a top plan view of such embodiment.

Fig. 2 is a side elevation of the same.

Fig. 3 is an upright section substantially on line 3—3 of Fig. 1, on a larger scale.

Fig. 4 is a detail of a modified construction.

The center draft bar 10 extends essentially from front to rear, and has the upper and lower hitch bars 11, 12 welded thereto at the front end, these hitch bars having vertically alined holes for receiving the draw pin of a tractor, for example, by which the weed chopper may be drawn over the field. Side frame members 13, 14, are welded to the draft bar 10 and extend symmetrically away and rearwardly from the connection, and are preferably bent at points along their lengths to provide the rear sections 15, 16 of these side members, these rear sections having lengths slightly larger than the over-all diameter of the rotatable chopping members as will be later described. Rear frame members 17, 18 connect the rear ends of the side frame members with the rear end of the draft bar 10. A transverse stiffening structure 19 is connected to the side frame members and extends from side to side and is connected to the center draft bar 10, to prevent collapsing inwardly or bending outwardly of the side frame members under heavy draft and while the chopper is making turns, at the ends of a field, for example.

Two rotatable drum members 22, 23 are provided, each being illustratively made as in Fig. 3 from a length of steel pipe 24 through which is coaxially passed a shaft 25; with the ends of the pipe closed by end pieces 24'. A desired number of blades 26 are provided, each extending in an axial plane in the embodiment, each being supported by braces 27, and each having its rearward edge cut away at a bevel so that a sharp edge is provided. The outer radial edges 28 of the blades may have curved outer corners, Fig. 1; but it is preferred to have the inner edges 29 cut straight and at an angle to the axis of rotation so that they pass close to the sides of the center draft bar 10 during their forward and downward revolving movement. The braces 27 in the illustrated embodiment of Figs. 1–3 are members welded to the drum surfaces in alined pairs having projecting parallel parts for receiving a replaceable blade 26 between them, and having holes through which the blade-securing rivets 27a are passed. In Fig. 4, the members 27 are shown as pairs of angles welded to the drum surfaces.

The extended ends of the shafts 25, beyond the ends of the drums formed by the pipes 24 and ends 24', are received by the center bearings 30 and the side bearings 31. The center bearings 30 are rigidly connected to the center draft member 10, opposite one another in the embodiment; and the side bearings 31 are carried by the rear sections 15, 16 of the side frame members. Dust seals such as 25a may be provided around the shafts adjacent the bearings.

Thus, the axes of the rotatable members 22, 23 of the embodiment lie in a horizontal plane, and are at an angle to one another, and are at equal angles to the center draft bar 10 or center line of the weed chopper. It has been found that at the preferred angle of the axis relative to the transverse direction of about 22½ degrees, corresponding to an angle of such axis of about 67½ degrees from the direction of the center draft bar 10, a desirable combination of hacking and slicing action is obtained, without an excessive drawbar power demand. Obviously, this angle may be varied, for example from about 55 to about 75 degrees relative to the center draft bar; but lesser or greater angles than that preferred have correspondingly lesser slicing action or greater power demand.

The embodiment shows the rear frame members at a corresponding angle, so that each of these pieces is parallel to the adjacent rotatable member axis: while the rear sections 15 and 16 of the side frames are at right angles thereto, so that the other bearings 31 are simple structures. In the embodiment, the frame members are of angle iron, and the connections between them, and with the center draft bar, are by welds. Likewise the braces 27 are welded to the pipes 24 in pairs, which receive the removable blades 26 between them; the blades being secured by rivets. A rear hitch 33 is provided, so that a drag or another cutter may be employed behind the device shown.

Cleaning bars 40 are connected to the rear frame members and extend toward the shafts in directions parallel to the inner ends of the adjacent cutting blades, to strip accumulations from these blades. These bars 40 are connected to the center draft bar 10 by the pieces 41; and the ends adjacent the roller axes are bent toward the respective radial plane and terminate near the center bearings. It will be noted that the parts 40—41—10—18 may be welded together.

The sizes of parts may be varied according to the expected service. Drums from ten to thirty-six inches in diameter have been used, but these sizes are not limits. The diameter, length, and weight are largely controlled by the available drawbar pull of the tractor used by the operator, and the nature of the work to be done, e. g. whether the terrain is level or hilly, the soil loose or cohesive, the growth tough or brittle, etc. Blades 26 having widths of about 4 to 8 inches have been found preferable for optimum strength, rigidity and length of service. The number and radial dimensions of the blades is preferably so related to the drum diameter that the cutting edges are spaced apart about 8 to 12 inches.

Such a device for use with the usual farm tractor may have the drums, formed from the pipes 24 and the ends 24', each about 14 inches in diameter and 42 inches long, with the flat cutting blades projecting 6 inches, so that the over-all diameter is 26 inches. Eight such blades were provided on the embodiment. Such an assembly of frame and rotatable members weighs about 1400 pounds; and hence a heavy hacking action is exerted as the device is drawn over the field, the cutting blades crushing down and hacking light weeds and scoring heavy weeds. When a weed stalk is not hacked and severed by the blade, the rolling and turning motion about an axis, at an angle to the general advancement, causes the blade edge to be drawn across the stalk with a slicing effect so that even strong and tough stalks, branches, etc., are severed. It will be noted that the blades tend to dig into the ground for a distance dependent upon the character of the soil, the size and resistance of vegetation, etc.; and therewith a turning or rolling motion is induced in the rotatable members, and also a slicing or upheaving effect is produced upon the weed roots, which adds to the effectiveness of the device.

The angular or skew relation and action means that each rotatable member, of itself, has a sidewise or lateral component of motion which is transferred to its bearings and thus to the frame. The device includes means to resist and compensate such sidewise forces, in that the two rotatable members are symmetrical so that a left-ward effort by one compensates and is compensated by a right-ward effort of the other. The efforts at the center bearings are transferred directly through the center draft bar 10; while efforts against the outer bearings are transferred by the rear and side frame members, and the transverse stiffening structure.

It is obvious that the invention is not limited to the illustrative embodiment shown, but that it may be practical in many ways within the scope of the appended claims.

I claim:

1. A weed chopper comprising a pair of rotatable members mounted to turn about substantially horizontal axes, said axes being at an angle to one another, a rigid mounting and draft frame connected to said members and having bearings therefor, and cutting blades projecting from said rotatable members substantially in axial planes of the respective member.

2. A weed chopper comprising a pair of drums, a center draft bar having thereon center bearings for the drums, side frame members rigidly connected to the center draft bar and extending angularly away therefrom and having outer bearings for the drums, said bearings being positioned and arranged to support the drum axes at respective angles forwardly and outwardly relative to the center draft member and to one another, rear frame members rigidly connected to the center draft bar rearwardly of said center bearings and rigidly connected to the side frame members rearwardly of the outer bearings, and cutting blades projecting from said rotatable members substantially in axial planes of the respective members.

3. A weed chopper as in claim 2, in which each said axis extends forwardly and outwardly from said center draft bar at an angle of substantially 67½ degrees therefrom.

4. A weed chopper as in claim 2, in which the cutting blade ends adjacent the center draft bar are cut at an angle to the radial plane essentially equal to the angle of the corresponding axis relative to the said center draft bar, and wherein a cleaner bar is connected to the center draft bar and to the rear frame member rearwardly of the corresponding drum, said cleaner bar extending parallel and close to the path of the cutting blade edges as they turn with said corresponding drum.

5. A weed chopper as in claim 2, in which a transverse stiffener is rigidly connected to the side frame members closely in front of the drums and extends from side to side and is connected to said center draft bar.

6. A weed chopper as in claim 2, in which each rear frame member extends forwardly and outwardly substantially parallel to the axis of the adjacent drum.

7. A weed chopper as in claim 1, in which the rotatable members are cylindrical drums, closing ends secured in said drums, and shafts in the drums and secured to said ends, said shafts extending beyond said ends and mounted in said bearings.

8. A weed chopper as in claim 7, in which the said ends are welded to the shafts and the drums, and in which pairs of spaced angular braces are welded to the drum surfaces, the cutting blades being secured between and to the pairs of braces.

9. A weed chopper comprising a rigid frame and a pair of rotatable members; said frame having a central draft bar, center bearings for the rotatable members, side frame members rigidly connected to the central draft bar and extending angularly outward and rearward therefrom, outer bearings for the rotatable members mounted on said side frame members, the side frame members projecting rearwardly beyond said outer bearings, rear frame members extending parallel to the axis of the rotatable members and rigidly connected to the central draft bar rearwardly of the center bearings and rigidly connected to the side frame members rearwardly of the outer bearings, a transverse stiffener member rigidly connected to said side frame members closely in front of the outer ends of the rotatable members and rigidly connected to the central draft bar; said rotatable members being mounted in said bearings and thereby held in a common plane, each rotatable member including a rotatable drum element and a plurality of cutting blades connected thereto and extending essentially from end to end thereof in substantially axial planes thereof.

10. A weed chopper comprising a rigid frame and a pair of rotatable members; said frame having a central draft bar, center bearings for the rotatable members, side frame members rigidly connected to the central draft bar and extending angularly outward and rearward therefrom, outer bearings for the rotatable members mounted on said side frame members, the side frame members projecting rearwardly beyond said outer bearings, rear frame members extending parallel to the axis of the rotatable members and rigidly connected to the central draft bar rearwardly of the center bearings and rigidly connected to the side frame members rearwardly of the outer bearings, a transverse stiffener member rigidly connected to said side frame members closely in front of the outer ends of the rotatable members and rigidly connected to the central draft bar; said rotatable members being mounted in said bearings and thereby held in a common plane, each rotatable member including a rotatable drum element and a plurality of cutting blades connected thereto and extending essentially from end to end thereof in substantially axial planes thereof, the axes of said rotatable members being fixed at the same angle of about $67\frac{1}{2}$ degrees from the central draft bar, the inner end of each blade being at an angle to the radial plane of the respective drum element and located to pass closely adjacent and parallel to the central draft bar.

MARLIN ELLER.

REFERENCES CITED

The following references are of record in the file of this patent:

UNITED STATES PATENTS

| Number | Name | Date |
|---|---|---|
| 1,336,065 | Bowers | Apr. 6, 1920 |
| 1,786,455 | Robbins | Dec. 30, 1930 |
| 1,887,818 | Michalka | Nov. 15, 1932 |

FOREIGN PATENTS

| Number | Country | Date |
|---|---|---|
| 27,515 | France | Mar. 18, 1924 |
| 220,125 | Great Britain | Aug. 14, 1924 |